Patented Apr. 7, 1936

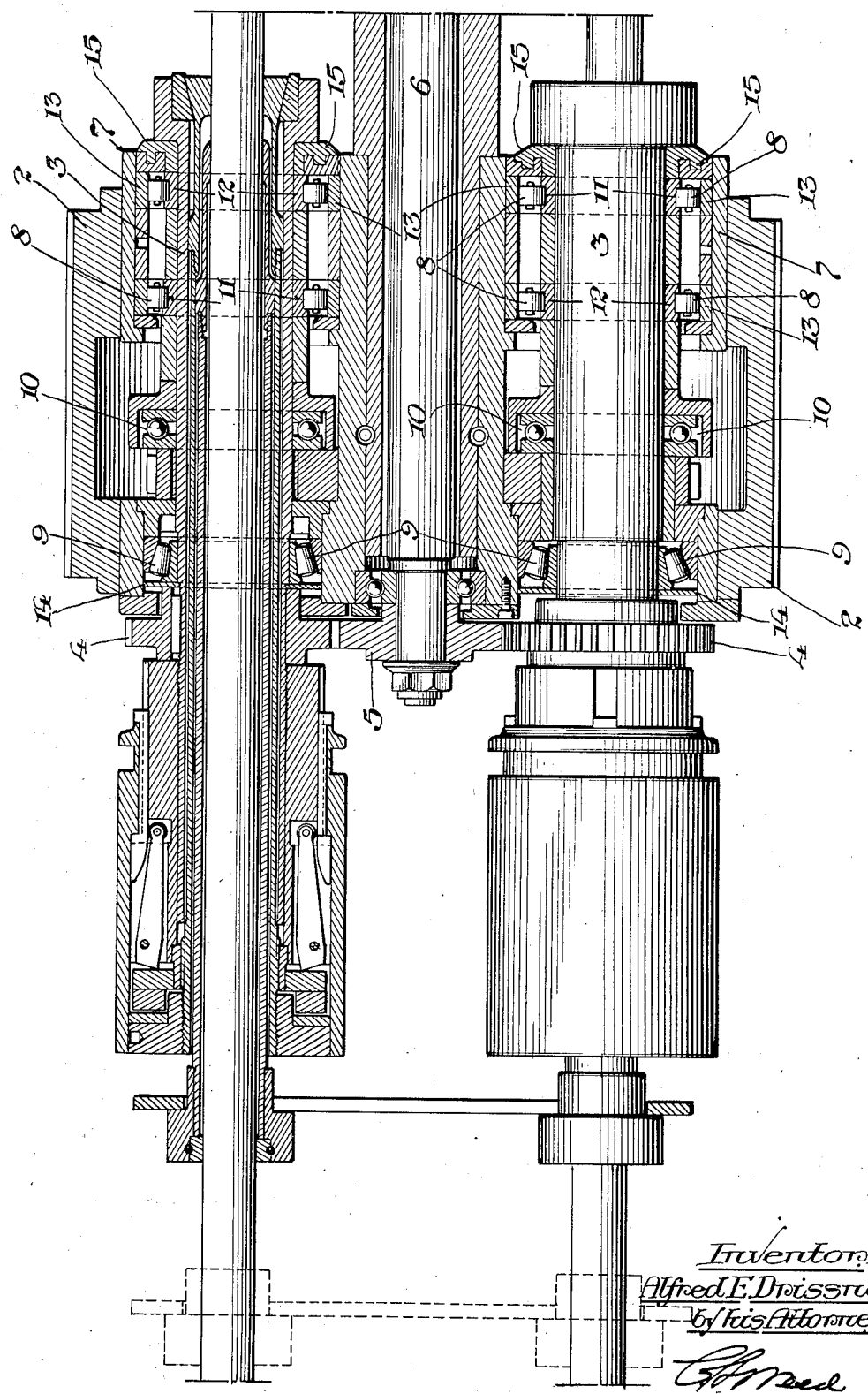

2,036,685

UNITED STATES PATENT OFFICE 2,036,685

SPINDLE BEARING FOR AUTOMATIC MULTIPLE SPINDLE SCREW MACHINES

Alfred E. Drissner, Cleveland, Ohio, assignor to The National Acme Company, Cleveland, Ohio, a corporation of Ohio Application January 19, 1934, Serial No. 707,286

12 Claims. (Cl. 308—174)

This invention relates to spindle bearings particularly adapted for use with rotary work spindles of automatic multiple spindle screw machines such as that shown and described in the contemporaneously pending application of this applicant and Charlie W. Simpson, Serial Number 632,490, filed September 10th, 1932, for an Automatic multiple spindle screw machine and assigned to the National Acme Company, although it may also be used with the rotary work spindle of a single spindle machine, the object of the invention being to provide an improved rotary spindle bearing by means of which the speed of the work spindles may be increased and greater accuracy in the tool operations upon the work obtained.

In multiple spindle machines, as is well known, the work in the form of stock rods is fed through hollow work spindles from the rear of such spindles and these stock rods are frequently from ten to twenty feet in length, there usually being from four to six hollow work spindles rotated at high speed and supported in an indexible work spindle carrier.

During the rotation of these spindles and at each indexing of the work spindle turret or carrier, a sliding tool carrier is shifted into position so that the tools carried thereby will operate on the ends of the rods carried by the rotating work spindles. At the same time, side forming or working tools carried by suitable cross and top slides perform cutting operations upon the sides of the stock rods.

These cutting operations, especially when performed at high speed, due to the pressure of the tools upon the stock rods, cause considerable end and radial thrust upon the stock rods and, therefore, upon the spindles and their bearings, it being a well-known fact that during the cutting operations, the stock rods are heated to such an extent that it causes smoke to rise from the ends of the stock rods while the cutting operation is going on and for this reason, it is a common practice, for the purpose of cooling the stock rods and the tools, to supply a continuous flow of liquid such as oil to the stock rods and tools adjacent to the cutting operations, thereby to materially reduce the heat and insure greater accuracy of the work since this heat so generated is imparted to the work spindles and causes them to expand, thus affecting the bearings and interfering with the proper rotation of the work spindles.

In the older forms of multiple spindle machines, the spindle bearings were simply bronze bushings mounted on the work spindles and running in steel-hardened and ground bushings fastened to the work spindle carrier and these particular bearings were efficient with the low spindle speed then required due to the style of cutting tools then in use but it was found that, as greater spindle speeds became necessary, the bearings of the spindles would expand and, consequently, freeze.

Subsequent to this, it was necessary to use tapered roller bearings, one set located at the front and the other at the rear of each rotary spindle. These tapered roller bearings were mounted opposite to each other so as to take care of both end and radial thrust at the same time but it was discovered that as soon as the spindles started to warm up, due to the cutting action of the tools on the work, the work spindles would expand under the heat and as the tapered bearings were opposed to each other, this would cause the bearings to shift away from each other and thus loosen up the bearings to such an extent that the cutting of the work by the tools was inaccurate, it being remembered that a tolerance only of .0005" to .001" plus or minus is permitted in the work frequently performed on these machines.

Further experiments were made and as a result, ball bearings were substituted at the front and rear of each spindle for the tapered roller bearings but the same results occurred as with the tapered bearings. In other words, as the spindles heated up and expanded, it permitted the ball bearings to become loose with resultant inaccuracies in the work.

A great many experiments have been made during the past twenty years with different types of ball bearings, tapered bearings and straight roller bearings but none has proven entirely satisfactory and, in fact, have caused considerable trouble due to the high precision work that has to be produced on these automatic machines. The overhang of the spindles in the rear of the spindle carrier, the heavy weight of the driving gears, the finger holders and chucking mechanism, the length of the feed tubes and the twelve and in some cases, twenty foot lengths of bar stock that have to be fed through the work spindles has resulted in such an enormous whip that bearings different from those hereinbefore outlined had to be provided to overcome these difficulties and permit greater speed of the work spindles and greater accuracy in the work.

During these experiments, it was found that when tapered roller bearings were used at the front and rear or when ball bearings were used, when either of these styles of bearings was under pressure during the cutting of the bar stock by either the forming, turning or drilling tools, due to the high speed of modern cutting tools, the bar stock was heated up to a certain degree and, therefore transferred the heat to the front spindle bearing which would cause expansion of the spindle endwise and result in a loss of accuracy in the cutting of the work.

As the result of some four years of costly experimentation, it has been discovered that by a combination of straight roller bearings, ball thrust bearings and tapered roller bearings, the difficulties hereinbefore referred to have been overcome so that by using straight roller bearings at the front of each spindle, ball thrust bearings at the middle thereof and tapered roller bearings at the rear of the spindle, inaccuracy of the work is no longer present and the spindles can run at high speed without excessive heating so that greater accuracy is obtained as demanded on modern machines.

In the drawing accompanying and forming a part of this specification, the figure illustrates a longitudinal sectional view of the work spindle carrier showing two of the work spindles therein, each supported by the improved form of bearings herein set forth.

Before explaining in detail the present improvement and mode of operation thereof, I desire to have it understood that the invention is not limited to the details of construction and arrangement of parts illustrated in the accompanying drawing since the invention is capable of other embodiments, and that the phraseology which I employ is for the purpose of description and not of limitation.

The finger holding mechanism shown at the rear of the gears for rotating the work spindles for controlling the operation of the chucks or collets carried by the rotary work spindles for the necessary feeding and holding of the stock rods in the spindles during the cutting operation forms the subject-matter of the application of Charles Q. Garey, Serial Number 694,555, filed October 21st, 1933, and assigned to the National Acme Company.

In the preferred form shown, the indexible work spindle carrier or housing 2 is suitably mounted on the bed of the machine for indexible movement, the indexing of this carrier at intervals being done by suitable mechanism such as shown and described in the application first hereinbefore referred to.

Located in this carrier are a series, usually four to six, of rotary work spindles 3 rotated at high speed by suitable gears 4 mounted, one on each spindle, and in mesh with a central gear 5 carried by a suitable drive shaft 6 in the manner shown and described in said application first hereinbefore referred to.

Each of these rotary work spindles is mounted in a tubular spindle carrier or sleeve 7 supported in the bore of the work spindle carrier or housing 2, and between the tubular spindle carrier 7 and the spindle, at the front of the spindle 3, there are located a series comprising one or more sets of spaced straight roller bearings shown as two sets 8 and between the tubular carrier 7 and the spindle at the rear thereof is located a set of tapered roller bearings 9 and suitably supported between these straight and tapered bearings is a set of ball bearings 10. These center bearings are used as a thrust bearing only, the tapered rear bearings being adjustable for end thrust and radial fit.

In the present improvement, the straight roller bearings at the front can be fitted with extreme accuracy with a tolerance of not more than .0002 to .0003" running fit, and this type of roller bearing allows the front bearing spindle to expand and locate itself without sacrificing accuracy whereas, if a radial ball thrust or a tapered roller bearing were used in this front bearing in combination with a rear bearing, the result would be that as soon as side or radial pressure was applied to the work by a forming tool, it would have a tendency to push the spindle out of alignment whereas, with the present straight roller bearing used in the front bearing, this is impossible.

This is a very important feature which I believe has not so far been discovered by any machine tool builder so that this particular type of combination bearing adapted not only for multiple spindle machines but for any other types of machine tools, has been shown by experiment to be a great improvement in spindle bearings.

The bearings of the several forms are suitably supported between ring formed race or bearing members adapted for the particular form of bearing and are held in proper position with the inner ring member of each set properly secured to the work spindle and it will be observed that the front bearings 8 are carried in grooves 11 of the inner ring members 12 but there are no grooves in the outer ring members 13 and this allows for endwise expansive action of the spindle due to heat generated without affecting the accuracy of the machine.

The ball thrust bearings 10 located between the front and rear bearings take care of the end thrust of the work spindle caused by such cutting tools as drills, counter bores, turning tools, etc., acting at the ends of the stock rods. In other words, this ball thrust bearing holds the spindle in position so that when the rear tapered roller bearings are adjusted correctly, there is no end play whatever on the work spindle. The reason for using this ball thrust bearing in front of the tapered bearing is that if tapered bearings were used as a thrust bearing, there would be a slight motion due to the construction of the bearing when pressure was applied and, although very little, this slight movement of the spindle endwise would spoil the formation of a shoulder in the work when the stock rod was being drilled and formed with a shoulder, so that an inaccurate shoulder would be obtained.

By using a tapered roller bearing at the rear of the spindle, a heavy duty, robust bearing is provided for taking up shock or whip of the parts for such a bearing will take care of all shocks created by the chuck opening and closing mechanism and also by the gear driving mechanism and by the length of the bar stock.

It will also be noted that the ball thrust bearing and the rear tapered roller bearings are located relatively close to each other. This is for the reason that should there be any expansion of the work spindle due to the heat, this expansion over so short a distance will be at a minimum whereas, if the thrust bearing were applied at a much greater distance in front of the rear bearing, the result would be that the expansion would be at least ten times as much and result in great inaccuracy in the work.

The tapered bearings at the rear are protected by means of a suitable disk or plate 14 and the roller bearings are similarly protected from grit, cutting compound, etc., by the interlocking parts 15.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an automatic multiple spindle screw machine having an indexible work spindle carrier provided with a plurality of rotary work spindles, the combination of a series of straight roller bearings comprising two spaced sets of bearings at the front of the spindle, a set of tapered roller bearings, and a set of ball thrust bearings between said straight and tapered bearings and in alignment for supporting each spindle within the indexible carrier.

2. In an automatic multiple spindle screw machine having an indexible work spindle carrier provided with a plurality of rotary work spindles, the combination of a set of straight roller bearings, a set of tapered roller bearings, and a set of ball thrust bearings in alignment for supporting each spindle within the indexible carrier, the set of ball bearings being located between the straight and tapered bearings.

3. In an automatic multiple spindle screw machine having an indexible work spindle carrier provided with a plurality of rotary work spindles, the combination of a set of straight roller bearings, a set of tapered roller bearings, and a set of ball bearings in alignment for supporting each spindle within the indexible carrier, the set of straight roller bearings being located at the front of each spindle, the tapered roller bearings in the rear thereof and therebetween the set of ball bearings.

4. In an automatic multiple spindle screw machine having an indexible work spindle carrier provided with a plurality of rotary work spindles, the combination of a set of straight roller bearings, a set of tapered roller bearings, and a set of ball bearings in alignment for supporting each spindle within the indexible carrier, the set of straight roller bearings being located at the front of each spindle, the tapered roller bearings in the rear thereof and therebetween the set of ball bearings, the latter located relatively close to the tapered roller bearings.

5. In an automatic multiple spindle screw machine having an indexible work spindle carrier provided with a plurality of rotary work spindles, the combination of a series of straight roller bearings, a set of tapered roller bearings, and a set of ball bearings in alignment for supporting each spindle within the indexible carrier, the series of straight roller bearings comprising two sets of spaced bearings at the front of the spindle.

6. In a machine having a rotary spindle, the combination of bearings therefor comprising a series of straight roller bearings, a set of tapered roller bearings, and a set of ball thrust bearings, the straight roller bearings being located at the front end of the spindle, the tapered roller bearings in the rear thereof and the ball bearings therebetween.

7. In a machine having a rotary spindle, the combination of bearings therefor comprising a series of straight roller bearings, a set of tapered roller bearings, and a set of ball bearings, the straight roller bearings being located at the front end of the spindle, the tapered roller bearings in the rear thereof and the ball bearings therebetween, the latter located relatively close to the tapered roller bearings thereby to reduce expansion due to heat to a minimum.

8. In a machine having an indexible work spindle carrier and a plurality of rotary work spindles carried thereby, the combination of bearings for the spindle comprising straight roller bearings located to support the spindle at the front end thereof, ball bearings in the rear thereof and spaced therefrom, and adjustable tapered roller bearings in the rear of said ball bearings and spaced therefrom and all located in alignment around said spindle and effective to prevent radial and endwise movement of the spindle.

9. In a machine having an indexible work spindle carrier and a plurality of rotary work spindles carried thereby, the combination of bearings for the spindle comprising straight roller bearings located to support the spindle at the front end thereof, ball bearings in the rear thereof and spaced therefrom, adjustable tapered roller bearings in the rear of said ball bearings and spaced therefrom and all located in alignment around said spindle and effective to prevent radial and endwise movement of the spindle, and a pair of ring-shaped supporting means for the straight roller bearings, only the outer member thereof having grooves for the reception of said bearings.

10. In a machine having a rotary spindle, the combination of bearings therefor comprising a series of straight roller bearings adjacent to the front end of the spindle, a set of tapered roller bearings adjacent to the rear end thereof, and a set of ball thrust bearings therebetween.

11. In a machine having a rotary spindle, the combination of bearings therefor, comprising a series of straight roller bearings adjacent one end of the spindle, a set of tapered roller bearings adjacent the other end thereof, and a set of ball thrust bearings therebetween.

12. In a machine having a rotary spindle, the combination of bearings therefor comprising a series of straight roller bearings, a set of tapered roller bearings, and a set of ball thrust bearings therebetween in relatively close relationship to the tapered roller bearings.

ALFRED E. DRISSNER.